United States Patent
El-Shoubary et al.

(10) Patent No.: US 7,091,262 B2
(45) Date of Patent: Aug. 15, 2006

(54) PARTICULATE INORGANIC SOLIDS TREATED WITH ORGANOPHOSPHINIC COMPOUNDS

(75) Inventors: Modasser El-Shoubary, Crofton, MD (US); Robert Kostelnik, Ellicot City, MD (US)

(73) Assignee: Millennium Inorganic Chemicals, Inc., Houston, TX (US)

( * ) Notice: Subject to any disclaimer, the term of this patent is extended or adjusted under 35 U.S.C. 154(b) by 427 days.

(21) Appl. No.: 10/632,385

(22) Filed: Aug. 1, 2003

(65) Prior Publication Data
US 2005/0027038 A1 Feb. 3, 2005

(51) Int. Cl.
*C08K 9/00* (2006.01)

(52) U.S. Cl. ............... 523/200; 523/216; 106/415; 106/416; 106/425; 106/436; 106/447; 106/463; 106/468; 524/133; 524/136; 524/139; 524/148

(58) Field of Classification Search ........... 523/200, 523/216; 106/415, 425, 436, 463, 468; 524/133, 524/136, 139, 148
See application file for complete search history.

(56) References Cited

U.S. PATENT DOCUMENTS

| 3,322,716 A | 5/1967 | Klein et al. |
| 3,374,288 A | 3/1968 | Lange et al. |
| 3,582,510 A | 6/1971 | Lüders et al. |
| 4,357,170 A | * 11/1982 | Brand ............... 106/448 |
| 4,496,670 A | * 1/1985 | Vas et al. .......... 523/205 |
| 5,061,743 A | 10/1991 | Herring et al. |
| 5,260,353 A | 11/1993 | Palmer et al. |
| 5,362,770 A | 11/1994 | Palmer et al. |
| 5,837,049 A | 11/1998 | Watson et al. |

FOREIGN PATENT DOCUMENTS

| GB | 1 345 551 | 1/1974 |
| GB | 1 385 781 | 2/1975 |

OTHER PUBLICATIONS

Nifant'ev et al., "Acid Catalysis in the Hydrophosphorylation of Olefins," Plenum Publishing Corporation, pp. 1416-1423, 1981.

Karanewsky et al., "Discovery of (S)-1-[6-Amino-2-[[hydroxy(4-phenylbutyl)phosphinyl]-1-oxohexyl]-L-proline,a Novel Orally Active Inhibitor of ACE," American Chemical society, 1987.

\* cited by examiner

*Primary Examiner*—Edward J. Cain
(74) *Attorney, Agent, or Firm*—Kevin M. Carroll

(57) ABSTRACT

A treatment for particulate inorganic solids is provided. This treatment, which uses certain organophosphinic compounds, imparts improved physical and chemical qualities including lacing resistance, improved dispersion and decreased chemical reactivity when these treated particulate inorganic solids are incorporated into polymeric matrices. The addition of the organophosphinic compounds of the present invention may flexibly be incorporated into known processes at varying points, and are preferably added downstream of any filtering steps or to a dry particulate inorganic solid.

21 Claims, No Drawings

PARTICULATE INORGANIC SOLIDS TREATED WITH ORGANOPHOSPHINIC COMPOUNDS

FIELD OF THE INVENTION

The present invention relates to particulate inorganic solids, and, in particular, particulate inorganic solids that have been treated with certain organophosphinic compounds, such as organophosphinic acids and their salts.

BACKGROUND OF THE INVENTION

The incorporation of particulate inorganic solids into polymer matrices has been performed for many years, and, over the years, particulate inorganic solids have been and continue to be incorporated into polymer matrices for many reasons. For example, they may be used as fillers. They may also be used to impart better physical and chemical attributes to polymer matrices, including decreased chemical activity and improved thermal stability, especially lacing resistance in extruded polymer film applications. In order to obtain different benefits, particulate inorganic solids may be treated in different ways, including by adding surface treatments.

Commonly used particulate inorganic solids for incorporation into polymer matrices include titanium dioxide and kaolin. Known surface treatments that have been applied to these solids include silanes, alkanolamines, polyols, organophosphoric acids, organosulfonic acids, and phosphorylated polyenes. The optimal treatment will in part depend on the attributes that one wants in a treated solid, which will in part depend on the application in which it will be used. Often one wants to provide a hydrophobic particulate solid that is stable, easy to prepare, cost effective, able to be dispersed to a high degree in polymers, and not reactive in the presence of other additives such as lithopone. However, despite the numerous known surface treatments, for various reasons, including cost and desired properties, no known surface treatments are ideal for all applications. Thus, there is always a need to develop new and better treatments for particulate solids.

Surprisingly, it was found that by treating an inorganic particulate solid with an organophosphinic compound, a composition that has good dispersiblity in polymer matrices could be produced. The present invention is directed to these treated inorganic particulate solids, methods for making them, and uses for them.

SUMMARY OF THE INVENTION

The present invention provides treated particulate inorganic solids for use in polymeric matrices as pigments, fillers, extenders, ultraviolet absorbers, etc., as well as methods for making these treated particulate inorganic solids. The treated particulate inorganic solid of the present invention comprises a particulate inorganic solid that is treated with one or more organophosphinic compounds. Optionally, the treated particulate inorganic solid may also comprise a metal oxide. The treated particulate inorganic solid of the present invention may be formed by treating a particulate inorganic solid with an organophosphinic acid compound or a salt of an organophosphinic compound that may be represented by the following formula:

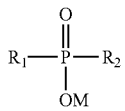

wherein $R_1$ is an organic group having 2 to 22 carbon atoms,
$R_2$ is hydrogen or an organic group having 2 to 22 carbon atoms, and
M is hydrogen, ammonium, organoammonium or a metal ion.

According to one embodiment, the present invention provides a treated particulate inorganic solid comprising:
(a) a particulate inorganic solid; and
(b) an organophosphinic compound having the formula:

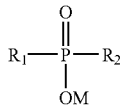

wherein $R_1$ is an organic group having 2 to 22 carbon atoms,
$R_2$ is hydrogen or an organic group having 2 to 22 carbon atoms, and
M is hydrogen, ammonium, organoammonium or a metal ion.

According to a second embodiment, the present invention provides a method for preparing a treated particulate inorganic solid composition. The method comprises filtering a slurry, wherein said slurry comprises a particulate inorganic solid and combining the filtered particulate inorganic solid with the organophosphinic compound of the first embodiment.

According to a third embodiment, the present invention provides another method for preparing a treated particulate inorganic solid composition. This method comprises combining a dry particulate inorganic solid with the organophosphinic compound of the first embodiment.

The treated particulate inorganic solids of the present invention may be combined with and readily dispersed into polymers to form polymer matrices after the particulate inorganic solids have been treated with the organophosphinic compound. The particulate inorganic solids of the present invention have excellent dispersion, lacing resistance and other physical properties when incorporated into polymeric articles and films.

The treated particulate inorganic solids of the present invention may also be used to prepare highly loaded polymer masterbatches. The treated particulate inorganic solids exhibit especially excellent dispersion qualities when incorporated into masterbatches containing up to about 85% of the treated particulate inorganic solids. These highly loaded masterbatches are useful in applications in which dispersion and thermal stability, especially resistance to lacing, are critical.

DETAILED DESCRIPTION OF THE INVENTION

The present invention is directed to particulate inorganic solids for use in connection with polymers and the methods for making these particulate inorganic solids. According to the present invention, a particulate inorganic solid is treated with an organophosphinic compound. The resulting treated particulate inorganic solid may then be combined with a polymer to form a polymer matrix.

The present disclosure is not intended to be a treatise on either particulate inorganic solids or the production of polymer matrices, and readers are referred to appropriate, available texts and other materials in the field for additional background on the subject matter of this invention.

The treated particulate inorganic solids made according to present invention comprise a particulate inorganic solid that is treated with an organophosphinic compound. Preferably, the particulate inorganic solid further comprises a metal oxide such as aluminum oxide. Suitable particulate inorganic solids for use in the present invention include, but are not limited to, titanium dioxide, kaolin, talc, calcium carbonate, zinc oxide and mica. The phrase "particulate inorganic solid" as used herein refers to the particulate inorganic solid that has not been treated with an organophosphinic compound. Preferably, titanium dioxide is the chosen particulate inorganic solid. When the particulate inorganic solid is titanium dioxide, the titanium dioxide may be either rutile, produced by either the sulfate or chloride process, or anatase, produced by the sulfate process. The processes for making rutile and anatase particulate inorganic solids are well known to persons skilled in the art.

Included in the present invention are compositions in which the particulate inorganic solid is titanium dioxide in a form that is suitable to impart whiteness and opacity. This form of titanium dioxide is commonly referred to as pigmentary titanium dioxide. Also included in the present invention are compositions in which the particulate inorganic solid is a form of titanium dioxide that is commonly referred to as "transparent" titanium dioxide. Transparent titanium dioxide has little propensity to scatter or to absorb visible light, but has a good ability to absorb ultraviolet light. Therefore, as persons skilled in the art are aware, transparent titanium dioxide is added to plastics and other compositions to provide protection from ultraviolet light.

The normal particle size range for particulate inorganic solids is from about 0.10 microns to about 20 microns. When the particulate inorganic solid is considered a filler or an extender, such as kaolin, calcium carbonate, talc and mica, the particle size range is normally from about 0.5 microns to about 20 microns. For particulate inorganic solids generally considered to be pigments, the average particle size ranges from about 0.1 microns to about 0.5 microns. Generally, when the particulate inorganic solid is titanium dioxide in the pigmentary form, the average particle size is in the range of 0.2–0.35 microns. When the particulate inorganic solid is transparent titanium dioxide, the average particle size is from about 0.01 to 0.15 microns. When the particulate inorganic solid shape is roughly spherical, these measurements represent the diameter. When the particulate inorganic solid shape is acicular or nonspherical, then these measurements represent the measurement of the longest dimension.

Preferably, the organophosphinic compounds of the present invention have at least one organic group that contains from about 2 to about 22 carbon atoms. Unless otherwise specified, these organic groups may be substituted or unsubstituted, linear or branched or cyclic, and saturated or unsaturated. Examples of organic groups useful in the present invention include, but are not limited to ethyl-, propyl-, butyl-, isobutyl-, tertiary butyl-, pentyl-, hexyl-, heptyl-, octyl-, isooctyl-, 2-ethyhexyl-, decyl-, dodecyl- and the like. Preferably, the organic group is a linear hexyl-, a linear octyl-, isooctyl- or 2-ethyhexyl-. Additionally, preferably the organic group is unsubstituted. Further, preferably $R_1$ and $R_2$ are not aryl compounds.

In order to prepare the treated particulate inorganic solid of the present invention, a particulate inorganic solid is treated with an organophosphinic compound that may in general be represented by Formula I, which includes not only organophosphinic acids, but also their salts. The phrase "organophosphinic compound" refers to both organophosphinic acids and the salts of organophosphinic acids. These organophosphinic compounds of Formula I may be synthesized de novo or obtained from commercial sources such as Fluka Chemical. For compounds that may be represented by Formula I, preferably $R_1$ and $R_2$ will be hexyl-, octyl-, isooctyl- or 2-ethyhexyl-. Formula I is:

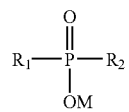

wherein $R_1$ is an organic group having 2 to 22 carbon atoms, $R_2$ is hydrogen or an organic group having 2 to 22 carbon atoms, and M is hydrogen, ammonium, organoammonium or a metal ion.

The above described organophosphinic compounds, which are used to form the surface treatment of the present invention, will be used to treat the particulate inorganic solid in order to form a treated particulate inorganic solid. The phrase "treated particulate inorganic solid" refers to any particulate inorganic solid that has been surface treated or modified. The phrase "organophosphinic treated particulate inorganic solid" refers to a particulate inorganic solid that has been treated with any substance that may be represented by the above Formula I. The preferable amount of organophosphinic compound will depend on the application into which it will be used and on the nature of the particulate inorganic solid. In general, there will be about 0.1 weight percent to about 30 weight percent of the organophosphinic compounds, based on the weight of the particulate inorganic solid. The amount of organophosphinic compound used to treat pigmentary size particulate inorganic solids is preferably from about 0.1 percent to about 5 percent by weight, based on the weight of the particulate inorganic solid; more preferably from about 0.3 percent to about 2.0 percent; and most preferably from about 0.7 percent to about 1.2 percent. For smaller particle size particulate inorganic solids, the amount of organophosphinic compounds is generally greater. For transparent titanium dioxide, the amount of organo-phosphinic compound used is preferably from about 3 to 30 percent by weight, based on the weight of the transparent titanium dioxide; more preferably from about 5 to about 30 percent; and most preferably from about 10 to 20 percent.

The organophosphinic compound may be combined with the particulate inorganic solid at any one of a number of stages of production of the treated particulate inorganic solid. When generating treated titanium dioxide, one of the reasons that the organophosphinic compound may be incorporated into any one of a number of the production steps of the chloride and/or sulfate processes is that there are no byproducts of the interaction of the organophosphinic compound and the particulate inorganic solid's surface, or at the most, water or a salt may be the byproducts, both of which are easily removed.

Preferably, the combining of the particulate inorganic solid and the surface treatment of the present invention will occur at a temperature of from about 10° C. to about 270° C. The optimal temperature at which the particulate inorganic solid and the surface treatment are combined is dependent on the step in the particulate inorganic solid production process in which the surface treatment is added.

Additionally, preferably, any metals that are present, will be present in their oxide forms, and more preferably, aluminum oxide will be present at the time that the organophosphinic compound is being added. Most preferably, between about 0.2 wt % and 1.2 wt % alumina will be used, based on the weight of the particulate inorganic solid. The use of alumina in the production of particulate inorganic solids, particularly titanium dioxide, is well known to persons skilled in the art.

Under these conditions, the particulate inorganic solid may be referred to as "an unactivated particulate inorganic solid," in order to distinguish from circumstances in which a metal such as aluminum is present in its ionic form and activates the particulate inorganic solid. During preparatory processes such as the production of $TiO_2$, the pH values under which "unactivated particulate inorganic solids" exist may, for example, be found when a filter cake has been formed, or after the organophosphinic compound has been added to the particulate inorganic solid. Additions at these points are particularly beneficial because under standard processing no subsequent filtering is performed; consequently, organophosphinic compounds will not be removed and the process may be performed economically.

The methods for adding the organophosphinic compound may be similar to methods for adding other surface treatments that are flexibly and easily incorporated into particulate inorganic solid production processes. Thus, there are many places during production of a particulate inorganic solid in which the organophosphinic compound may be added and the points of additions described herein are not meant to be exhaustive. The optimal point during which to add the organophosphinic compound will in part depend on the process in which it is to be incorporated.

In the simplest of methods, the organophosphinic compound may be added by spraying or pouring into a system in which the particulate inorganic solid is already present. To maximize the uniformity of the distribution of the organophosphinic compound, one may wish to mix or to stir the organophosphinic compound and the particulate inorganic solid. Methods for mixing a treatment and a particulate inorganic solid are well known to persons skilled in the art. Devices such as a V-shell blender equipped with an intensifier bar for application of a liquid to a powder or other suitable mixing devices now known or that come to be known to those skilled in the art may be used.

Alternatively, the organophosphinic compound may be metered into a micronizer or jet pulverizer along with the particulate inorganic solid powder to be ground. Air or steam micronization techniques may be used at temperatures from room temperature up to 250° C. or higher as is known or easily knowable to persons skilled in the art.

In a conventional production process, the organophosphinic compound may, by way of further example, be added at the spray dry feeder, to a high intensity milling device or to a micronizer feed prior to or concurrent with micronization. As described above, it is not as effective to add the organophosphinic compound to a particulate inorganic solid slurry prior to filtration and washing since a portion of the organophosphinic compound will be lost upon washing of the particulate inorganic solid. By contrast, adding the organophosphinic compounds of the present invention to the filter cake or micronizer feed minimizes the loss of the organic portion, thereby improving manufacturing efficiency. Thus, it is desirable to add the organophosphinic compound to a fluidized, washed filter cake with agitation in order to assure uniform mixing of the organophosphinic compound among the particulate inorganic solid particles. Further, in some embodiments, it is desirable to add the organophosphinic compound after any filtration and washing stages, but prior to any drying stage.

If the organophosphinic compound is added to a dry particulate inorganic solid such as a spray drier product or micronizer feed, particular care must be taken to ensure uniform mixing of the organophosphinic compound with the particulate inorganic solid powder. This may, for example, be accomplished by using a V-shell blender equipped with an intensifier bar for application of the organic as a neat liquid or solution or by using other suitable mixing devices. If the organophosphinic compound is a solid material, then dissolving it in water, ethanol, tetrahydrofuran or any suitable solvent will aid in uniform application of the organophosphinic compound to the particulate inorganic solid.

By dissolving the solid substance in a solvent, uniform mixing is more easily obtained. For example, when the organophosphinic compound is dissolved in an appropriate solvent, it may be added after the particulate inorganic solid is dried, prior to entry into a micronizer or to the micronizer itself at the same time the particulate inorganic solid is added to the micronizer.

After the organophosphinic compound has been combined with the particulate inorganic solid, the treated particulate inorganic solid may be fluid energy milled using steam or air to produce a treated, finished particulate inorganic solid that retains high levels of the organophosphinic compound. When a treatment is added after all filtering steps, the amount of the treatment that remains associated with the particulate inorganic solid is much greater than if there were a filtration step after addition of the surface treatment. This can reduce the overall cost of producing the treated particulate inorganic solid.

When, for example, the particulate inorganic solid is titanium dioxide, the organophosphinic compound may be added to the untreated titanium dioxide directly obtained from a production process such as the chloride or sulfate processes. Additionally, the particulate inorganic solid titanium dioxide may be further treated with metal oxides, such as aluminum oxide, silicon dioxide, zirconium oxide and the like, using any process known to those skilled in the art, prior to treatment with the organophosphinic compound of the present invention. Other examples of treatments include phosphates and tin. Additionally, the untreated particulate inorganic solid or the treated particulate inorganic solid may be secondarily treated with polyalcohols such as trimethylolethane and trimethylolpropane or alkanolamines such as triethanolamine prior to addition of the organophosphinic compound or subsequent to addition of the organophosphinic compound. One may also choose to treat with inorganic phosphates or combinations of inorganic phosphates and metal oxides. Further, one may choose to treat with combinations or mixtures of the aforementioned compounds. When the particulate inorganic solid is titanium dioxide, the particulate inorganic solid that has been treated with an organophosphinic compound may, for example, be fluid energy milled using steam or air to produce a finished particulate inorganic solid that retains high levels of the organophosphinic compound thereby reducing the overall cost of producing modified $TiO_2$.

Once the organophosphinic acid treated particulate inorganic solid is formed, it may then be combined with a polymer to form a polymer matrix. The phrase "polymer matrix" refers to the substance comprising a polymer and the treated particulate inorganic solid. Polymers that may be of use in the present invention include but are not limited to polymers for use in thermoplastics applications such as polymers of unsubstituted ethylene monomers, including polyethylene, polypropylene, polybutylene, and copolymers of ethylene with alpha-olefins containing 4 to 12 carbon atoms or vinyl acetate; vinyl homopolymers, acrylic homopolymers and copolymers, polyamides, polycarbonates, polystyrene, acrylonitrile-butadiene-styrenes and polyethers. Other suitable polymer types also include polyvinylchloride, polyurethanes, polysulfones, polyimides, polyesters and chlorinated polyesters, polyoxyethylenes, phenolics, alkyds, amino resins, epoxy resins, phenoxy resins and acetal resins. Methods for combining treated particulate inorganic solids with polymers are well known to persons skilled in the art.

The treated particulate inorganic solid may be combined with the polymer and have a loading of up to about 85% by weight, based on the weight of the polymer matrix. Preferably, a loading of treated particulate inorganic solid of about 50% to about 85% by weight based on the weight of the polymer matrix is used. This loading may be used as a masterbatch. A "masterbatch" is meant to refer to a mixture of two or more substances that are blended together and then blended with one or more other ingredients that may be the same or different as either of the first two substances. The methods for creating a masterbatch with the treated particulate inorganic solid are known to or easily knowable by persons skilled in the art. For example, the masterbatch may be created by combining the treated particulate inorganic solid and the polymer using a BR Banbury mixer or a twin screw extruder.

It has been found, surprisingly and unexpectedly, that the treated particulate inorganic solids of this invention do not generate potentially hazardous or noxious gases when used in combination with the polymer filler lithopone, which contains combinations of zinc sulfide and barium sulfate. By contrast, when one uses phosphorylated polyenes in combination with lithopone a potentially hazardous gas is emitted.

It has also been found, surprisingly and unexpectedly, that the treated particulate inorganic solids of this invention impart good lacing resistance to thermoplastic polymers into which they are incorporated. Lacing, which is believed to be a measure of volatility at a specific weight percent of particulate inorganic solid loadings and processing temperatures, may manifest as a void or hole in a plastic film.

Because the treated particulate organic solids are particularly beneficial for use in thermoplastics applications, it is preferable to process them so that when they are combined with polymers for these applications, they contain an essential absence of organic solvents and water both prior to being combined with the polymer and after being combined with the polymer.

Further, it has been found surprisingly and unexpectedly that particulate inorganic solids made according to the present invention exhibit excellent dispersion when incorporated into thermoplastic polymeric film articles. As is known to persons who are skilled in the art, typically films contain up to approximately 14% treated inorganic solids.

EXAMPLES

The following examples set forth preferred embodiments of the invention. These embodiments are merely illustrative and are not intended and should not be construed to limit the claimed invention in any way.

The phosphinic compounds in the examples were prepared in accordance with general methods known to persons skilled in the art as described in for example, J. Med. Chem., 1988, 32, 204 and Zhurnal Obshcei Khimi, 1979, 50, 1744, subject to some modifications.

Example 1

In this example, 0.90% of diisooctylphosphinic acid is added to dry chloride process rutile $TiO_2$ base, which was coated with 0.20% alumina.

26.8 ml of a 386.4 grams $Al_2O_3$/liter solution of sodium aluminate were added to 5,230 grams of fine particle chloride process $TiO_2$ in a 350 grams/liter slurry with mixing at 70° C. The slurry pH was adjusted to 7.0 using a 50% sodium hydroxide solution, and the slurry was allowed to age for 30 minutes with stirring. The aged slurry was filtered and washed two times with 5000 ml aliquots of 80° C. deionized water, and then dried overnight at 115° C. in an oven. The dried filter cake was forced through an 8-mesh screen in preparation for treatment with diisooctylsulfonic acid.

9.0 grams of diisooctylphosphinic acid (Fluka Chemical) were added drop wise in a circular motion to 1000 grams of the dry, 8 meshed, alumina coated $TiO_2$ prepared as described above, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatch for dispersion and lacing evaluations, respectively. Results are given in Table 1.

Example 2

In this example, 1.10% of diisooctylphosphinic acid is added to dry chloride process rutile $TiO_2$ base, which was coated with 0.20% alumina.

11.0 grams of diisooctylphosphinic acid (Fluka Chemical) were added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatch for dispersion and lacing evaluations, respectively. Results are given in Table 1.

Example 3

Preparation of di-n-octylphosphinic acid. To a stirred mixture of 46.5 g (0.261 mol) of n-octylphosphinic acid in 250 mL 95% ethanol, 1-octene (58.6 g, 0.5218 mol) was added followed by 9.042 g (0.026 mol) of 70% benzoyl peroxide. The resulting mixture was refluxed for 8 hs, and then another 6.758 g (0.0196 mol) of benzoyl peroxide was added and the reaction continued to reflux for an extra 8 hs. A third 4.244 g of benzoyl peroxide was added (0.01305 mol) and refluxing continued for an extra 8 hs. The resulting mixture was cooled in the refrigerator, filtered, and 11.8 g of di-n-octylphosphinic acid was recovered using a rotary evaporator. The solid was washed with 100 mL of cooled 95% ethanol and the filtrate was concentrated on the rotary vacuum and replaced in the refrigerator. Another 24.9 g di-n-octylphosphinic acid was obtained on cooling to attain a total of 36.7 g (48.4% yield).

Example 4

In this example, 0.90% of di-n-octylphosphinic acid is added to dry chloride process rutile $TiO_2$ base, which was coated with 0.20% alumina.

9.0 grams of di-n-octylphosphinic acid prepared according to the method of example 3 were added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into a 75% $TiO_2$ containing low-density polyethylene masterbatch for dispersion evaluations. Results are given in Table 1.

Example 5

In this example, 1.10% of di-n-octylphosphinic acid is added to dry chloride process rutile $TiO_2$ base, which was coated with 0.20% alumina.

11.0 grams of di-n-octylphosphinic acid prepared according to the method of example 3 were added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into a 75% $TiO_2$ containing low-density polyethylene masterbatch for dispersion evaluations. Results are given in Table 1.

Example 6

Preparation of n-octylphosphinic acid. To a mixture of 95.1 g (0.897 mol) of sodium hypophosphite hydrate in 600 mL 95% ethanol, 23.8 mL of concentrated sulfuric acid was added. 1-Octene (33.6 g, 0.299 mol) was added to the stirred mixture followed by 1.69 g (0.0149 mol) of 30% hydrogen peroxide. The resulting mixture was refluxed for 8 hs, and then another 1.15 g (0.010 mol) of hydrogen peroxide was added and the reaction mixture was continued to reflux for another 8 hs. The resulting mixture was cooled, filtered, and then the ethanol was removed using a rotary evaporator. To the resulting residue, 200 mL water was added and then 50% sodium hydroxide solution was added until the solution became alkaline. The mixture was extracted twice with 200 mL diethyl ether, and the aqueous phase was then acidified with concentrated sulfuric acid. The aqueous layer was extracted with 200 mL ethyl acetate, and the organic layer was washed with saturated sodium chloride and then dried over anhydrous magnesium sulfate. The organic layer was decanted and the drying agent was washed with another 50 mL ethyl acetate. The combined organic layers were evaporated on a rotary evaporator. 45.2 g of n-octylphosphinic acid (84.8% yield) was obtained.

Example 7

In this example, 0.90% of n-octylphosphinic acid is added to dry chloride process rutile $TiO_2$ base, which was coated with 0.20% alumina.

11.9 grams of n-octylphosphinic acid prepared according to example 6 were added drop wise in a circular motion to 1200 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatch for dispersion and lacing evaluations, respectively. Results are given in Table 1.

Example 8

In this example, 1.2% of n-octylphosphinic acid is added to dry chloride process rutile $TiO_2$ base, which was coated with 0.20% alumina.

14.6 grams of n-octylphosphinic acid prepared according to example 6 were added drop wise in a circular motion to 1200 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatches for dispersion and lacing evaluations, respectively. Results are given in Table 1.

Example 9

Preparation of the sodium salt of n-octylphosphinic acid. 35.0 g of n-octylphosphinic acid prepared according to example 6 was dissolved in 100 mL 95% ethanol and the resulting solution was neutralized with 5M (50/50% EtOH/$H_2O$) sodium hydroxide using phenolphthalein as an indicator. The solvent was evaporated, and the corresponding sodium salt was recovered.

Example 10

In this example, 0.90% of n-octylphosphinic acid, sodium salt is added to dry chloride process rutile $TiO_2$ base, which was coated with 0.20% alumina.

9.0 grams of the n-octylphosphinic acid, sodium salt prepared according to example 9 were dissolved in 80.0 grams of deionized water. This solution was added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into a 75% $TiO_2$ containing low-density polyethylene masterbatch for dispersion evaluation. Results are given in Table 1.

Example 11

In this example, 1.10% of n-octylphosphinic acid, sodium salt is added to dry chloride process rutile $TiO_2$ base, which was coated with 0.20% alumina.

11.0 grams of n-octylphosphinic acid, sodium salt prepared according to example 9 were dissolved in 84.1 grams of deionized water. This solution was added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into a 75% $TiO_2$ containing low-density polyethylene masterbatch for dispersion evaluation. Results are given in Table 1.

Example 12

Preparation of n-hexylphosphinic acid and its sodium salt. To a mixture of 95.2 g (0.898 mol) of sodium hypophosphite hydrate in 600 mL 95% ethanol, 23.8 mL of concentrated sulfuric acid was added. 1-hexene (25.2 g, 0.30 mol) was added to the stirred mixture followed by 1.76 g (0.0155 mol) of 30% hydrogen peroxide. The resulting mixture was refluxed for 8 hs, and then another 1.14 g (0.0101 mol) of hydrogen peroxide was added and the reaction mixture was continued to reflux for another 8 hs. The resulting mixture was cooled, filtered, and then the ethanol was removed using a rotary evaporator. To the resulting residue, 200 mL water was added and then 50% sodium hydroxide solution was added until the solution became alkaline. The mixture was extracted twice with 200 mL diethyl ether, and the aqueous phase was then acidified with concentrated sulfuric acid. The aqueous layer was extracted with 200 mL ethyl acetate, and the organic layer was washed with saturated sodium chloride and then dried over anhydrous magnesium sulfate. The organic layer was decanted and the drying agent was washed with another 50 mL ethyl acetate. The combined organic layers were evaporated on a rotary evaporator. 37.0 g n-hexylphosphinic acid (82.4% yield) was obtained.

35.0 g of n-hexylphosphinic acid was then dissolved in 100 mL 95% ethanol and the resulting solution was neutralized with 5M (50/50% $EtOH/H_2O$) sodium hydroxide using phenolphthalein as an indicator. The solvent was then evaporated, and the corresponding sodium salt was recovered.

Example 13

In this example, 0.90% of n-hexylphosphinic acid, sodium salt is added to dry chloride process rutile $TiO_2$ base, which was coated with 0.20% alumina.

9.0 grams of n-hexylphosphinic acid, sodium salt prepared according to example 12 were dissolved in 78.2 grams of deionized water. This solution was added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into a 75% $TiO_2$ containing low-density polyethylene masterbatch for dispersion evaluation. Results are given in Table 1.

Example 14

In this example, 1.10% of n-hexylphosphinic acid, sodium salt is added to dry chloride process rutile $TiO_2$ base, which was coated with 0.20% alumina.

11.0 grams of n-hexylphosphinic acid, sodium salt prepared according to example 12 were dissolved in 86.2 grams of deionized water. This solution was added drop wise in a circular motion to 1000 grams of the dry, 8 meshed, alumina coated $TiO_2$ prepared as described in example 1, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into a 75% $TiO_2$ containing low-density polyethylene masterbatch for dispersion evaluation. Results are given in Table 1.

Example 15

In this example, 1.0% of diisooctylphosphinic acid is added to dry sulfate process rutile $TiO_2$ base, which was coated with 0.40% alumina.

52.4 ml of a 381.6 grams $Al_2O_3$/liter solution of sodium aluminate were added to 5000 grams of fine particle sulfate process $TiO_2$, commonly known as TiONA® RUF available from Millennium Chemicals, in a 350 grams/liter slurry with mixing at 70° C. The slurry pH was adjusted to 7.0 using a 50% sodium hydroxide solution, and the slurry was allowed to age for 30 minutes with stirring. The aged slurry was filtered and washed three times with 5000 ml aliquots of 80° C. deionized water, and then dried overnight at 115° C. in an oven. The dried filter cake was forced through an 8-mesh screen in preparation for treatment with diisooctylphosphinic acid.

10.0 grams of diisooctylphosphinic acid (Fluka Chemical) were added drop wise in a circular motion to 1000 grams of the dry, 8 meshed, alumina coated $TiO_2$ prepared as described above, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatch for dispersion and lacing evaluations, respectively. Results are given in Table 1.

Example 16

In this example, 1.36% of diisooctylphosphinic acid is added to dry sulfate process rutile $TiO_2$ base, which was coated with 0.40% alumina.

13.6 grams of diisooctylphosphinic acid (Fluka Chemical) were added drop wise in a circular motion to 1000 grams of the dry, 8 meshed, alumina coated $TiO_2$ prepared as described in example 15, which was spread to a 1 cm thickness on polyethylene film. The pigment was mixed with a large spatula and transferred to a one gallon wide-mouthed Nalgene bottle. The bottle containing pigment was rolled for 10 minutes on a roller mill. The rolled pigment was steam micronized to produce the finished pigment.

The finished pigment was incorporated into 75% and 50% $TiO_2$ containing low-density polyethylene masterbatch for dispersion and lacing evaluations, respectively. Results are given in Table 1.

Comparative Example 1

Rutile $TiO_2$, prepared by the chloride process, coated with hydrous alumina as described in Example 1 was treated with 0.60% by weight triethanolamine based on the weight of dry pigment.

The finished pigment was incorporated into 75% and 50% $TiO_2$ containing low-density polyethylene masterbatch for dispersion and lacing evaluations, respectively. Results are given in Table 1.

TABLE 1

| | Dispersion ($TiO_2$ Counts/Second) | Lacing |
| --- | --- | --- |
| Example 1 | 430 | 1.2 |
| Example 2 | 890 | 1.2 |
| Example 4 | 1,210 | not measured |
| Example 5 | 790 | not measured |
| Example 7 | 990 | 1.1 |
| Example 8 | 1,000 | 1.2 |
| Example 10 | 1,650 | not measured |
| Example 11 | 480 | not measured |
| Example 13 | 2,640 | not measured |
| Example 14 | 1,290 | not measured |
| Example 15 | 420 | 1.0 |
| Example 16 | 780 | 1.1 |
| Comparative Example 1 | 13,700 | 1.4 |

Determination of Dispersion and Lacing Performance

Lacing Evaluations

The high temperature stability of polymers containing particulate inorganic solids is an important property of commercial polymer films, especially polyethylene film applications. Voiding or "lacing" accompanies the failure of films. Lacing is believed to be a measure of volatility at specific weight percent particulate inorganic solid loadings and processing temperatures.

For the present invention, lacing tests were conducted on 50% $TiO_2$ concentrate samples prepared using a Haake Record 9000 Computer Controlled Torque Rheometer. Thus, 125 g of $TiO_2$ and 125 g of LDPE 722 manufactured by Dow Chemical Company were dry blended and added to the 75° C. preheated chamber with rotors running at 50 rpm. One minute after addition of the $TiO_2$/LDPE mixture, the chamber temperature was raised to 105° C. Frictional heat generated by the mixing process was allowed to drive the rate of incorporation of the $TiO_2$ into the LDPE until a steady state mixture was achieved. The concentrate was removed from the mixing chamber and placed into a Cumberland Crusher to obtain finely granulated 50% concentrate samples. The granulated concentrates were conditioned for 48 hours at 23° C. and 50% relative humidity. These concentrates were then let down into Dow Chemical 722 LDPE to achieve a 20% loading of $TiO_2$ in the final film.

Lacing evaluations were run on a 1' extruder equipped with a cast film slot die. A temperature profile of 625° F. die, 515° F. clamp ring, 415° F. zone 3, 350° F. zone 2, and 300° F. zone 1 was used. The screw speed was set at about 90 rpm. A 25.4 cm polished chrome chill roll, set in conjunction with the extruder was used to maintain a 75-μm-film thickness, and to cool and transport the films. The chill roll distance from the die lips was about 22 mm and the temperature was about 27° C.

After the $TiO_2$/LDPE mix was placed in the hopper, the material was allowed to purge until the appearance of a white tint in the film was first noted. To ensure the concentration of $TiO_2$ in the film had stabilized, a time interval of two minutes was allowed before lacing observations were recorded and a film sample obtained. The extruder was then purged with LDPE until the film turned clear. Lacing performance was determined by counting the relative size and number of holes generated in a film sample laid out on a dark surface. A 1.0–3.0 rating system was used. A rating of 1 was given to films with no lacing, 2 was given to films showing the onset of lacing and 3 was given to films with extreme lacing. Increments of 0.1 were used to give an indication of the relative performance between the samples.

Dispersion Testing

Using a small-scale laboratory extrusion apparatus, a measure of particulate inorganic solid dispersion into organic polymers was obtained by measuring the relative amount of particulate inorganic solid trapped onto screens of extruder screen packs. Tests were made using 75% $TiO_2$ concentrates in low density polyethylene prepared using a Haake 3000 Rheomix mixer. The mixer was controlled and monitored with a Haake 9000 Rheocord Torque Rheometer. 337.7 grams of micronized $TiO_2$ and 112.6 grams of NA209 LDPE manufactured by Equistar were dry blended and added to the 75° C. mixing chamber with rotors operating at 50 rpm. The mixer temperature was programmed to increase to 120° C. one minute after the dry blend was introduced to the mixing chamber. After a steady state mixture was achieved, the compound was mixed for an additional 3 minutes. The compound was removed from the chamber and granulated using a Cumberland crusher.

Dispersion tests were conducted using a Killion single screw extruder, model KL-100 equipped with a 20:1 length to diameter screw. The extruder was preheated at 330, 350, 390 and 380° F. from zone 1 to the die, respectively, and operated at 70 rpm. A purge of 1000 grams of NA952 LDPE manufactured by Equistar was run through the system, and a new screen pack was installed. The screen pack consisted of 40/500/200/100 mesh screens from the die towards the extruder throat. After temperature stabilization, 133.33 grams of granulated 75% $TiO_2$ concentrate was fed into the extruder. This was followed with 1500 grams of NA952 purge as the feed hopper emptied. After the LDPE purge was extruded, the screens were removed, separated and tested using a relative count technique from the measurements from an X-ray fluorescence spectrometer. The number of TiO$_2$ counts per second was obtained for the 100, 200 and 500 mesh screens in the pack and totaled to obtain the dispersion result. Lower TiO$_2$ counts per second are desired. A count result of less than 5000 is considered to represent excellent dispersion.

Reactivity with Zinc Sulfide
(Reactive Component in Lithopone)

Lithopone, a composition containing zinc sulfide is used as a filler and extender in various polymer compositions. When a TiO$_2$ pigment treated with a phosphorylated polyene such as Sylfat K® available from Arizona Chemical Company, is contacted with zinc sulfide at temperatures greater than about 20 to 25 degrees Centigrade, noxious odors are generated. In contrast, no odors are generated when pigments of the present invention are contacted with zinc sulfide under the same conditions.

Zinc Sulfide Reactivity

Example 17

5 grams of Millennium Chemicals RCL-4, a pigment product comprising titanium dioxide and a phosphorylated polyene, were placed in a sealed vial with 1 gram of zinc sulfide. The vial was heated to 200° C. for 10 minutes and an aliquot of the gas phase was then analyzed by combined gas chromatography and mass spectroscopy (GC/MS). Dimethyl sulfide was detected. A noxious odor was detected when the test vial was unsealed.

Example 18

The GC/MS test used in Example 17 was repeated using the n-octylphosphinic acid sodium salt treated TiO$_2$ pigment of example 11. No noxious odors were detected, and no organosulfur components were detected via GC/MS.

Example 19

The GC/MS test used in Example 17 was repeated using the diisooctylphosphinic acid treated TiO$_2$ pigment of example 16. No noxious odors were detected, and no organosulfur components were detected via GC-MS.

Having thus described and exemplified the invention with a certain degree of particularity, it should be appreciated that the following claims are not to be so limited but are to be afforded a scope commensurate with the wording of each element of the claim and equivalents thereof.

What is claimed:

1. A treated particulate inorganic solid composition comprising:
   (a) a particulate inorganic solid; and
   (b) an organophosphinic compound having the formula:

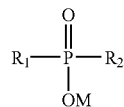

wherein
   R$_1$ is a organic group having from 2 to 22 carbon atoms, and
   R$_2$ is hydrogen, or an organic group having from 2 to 22 carbon atoms, and
   M is hydrogen, ammonium, organoammonium or a metal ion.

2. The treated particulate inorganic solid composition of claim 1, wherein the particulate inorganic solid is selected from the group consisting of kaolin, talc, calcium carbonate, zinc oxide and mica.

3. The treated particulate inorganic solid composition of claim 1, wherein the particulate inorganic solid is titanium dioxide.

4. The treated particulate inorganic solid composition of claim 1, wherein the particulate inorganic solid is treated with a compound selected from the group consisting of polyalcohols, alkanolamines, inorganic phosphates and mixtures thereof prior to addition of the orpanophosphinic compound, or the treated particulate inorganic solid composition is further treated with a compound selected from the group consisting of polyalcohols, alkanolamines, inorganic phosphates and mixtures thereof subsequent to addition of the organophosphinic compound.

5. The treated particulate inorganic solid composition of claim 1, wherein said composition further comprises an inorganic oxide.

6. The treated particulate inorganic solid composition of claim 5, wherein said inorganic oxide is selected from the group consisting of silicon dioxide, zirconium oxide and aluminum oxide.

7. The treated particulate inorganic solid composition of claim 1, wherein R$_1$ is hexyl-, octyl-, isooctyl- or 2-ethylhexyl-.

8. The treated particulate inorganic solid composition of claim 1, wherein the organophosphinic compound is present in the amount from about 0.1 percent to about 5 percent by weight of the particulate inorganic solid, based on the weight of the particulate inorganic solid prior to treating the particulate inorganic solid with the organophosphinic compound.

9. The treated particulate inorganic solid composition of claim 1, wherein the organophosphinic compound is present in the amount from about 5 percent to about 30 percent by weight of the particulate inorganic solid, based on the weight of the particulate inorganic solid prior to treating the particulate inorganic solid with the organophosphinic compound.

10. A polymer matrix comprised of a polymer and the treated particulate inorganic solid composition of claim 1.

11. The polymer matrix of claim 10, wherein the polymer is polyethylene.

12. The polymer matrix of claim 11, wherein the amount of the treated particulate inorganic solid composition is from about 50 percent to about 85 percent by weight of the polymer matrix, based on the weight of the polymer matrix.

13. The polymer matrix of claim 12, wherein the particulate inorganic solid is titanium dioxide.

14. A method for preparing a treated particulate inorganic solid composition, wherein said method comprises the steps of: (i) filtering a slurry, said slurry comprising a particulate inorganic solid; and (ii) combining said particulate inorganic solid after said filtering with an organophosphinic compound, wherein said organophosphinic compound has a formula of:

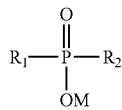

wherein
- $R_1$ is a organic group having from 2 to 22 carbon atoms, and
- $R_2$ is hydrogen, or an organic group having from 2 to 22 carbon atoms, and
- M is hydrogen, ammonium, organoammonium or a metal ion.

15. The method according to claim 14, wherein the particulate inorganic solid has been treated with the organophosphinic compound prior to a drying stage.

16. The method according to claim 14, wherein the particulate inorganic solid has been treated with the organophosphinic compound during a milling stage.

17. The method according to claim 14, wherein the particulate inorganic solid has been treated with the organophosphinic compound when the particulate inorganic solid is in the form of a filter cake.

18. A method for preparing a treated particulate inorganic solid, comprising combining a dry particulate inorganic solid and an organophosphinic compound, wherein said organophosphinic compound has a formula of:

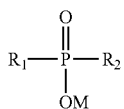

wherein
- $R_1$ is a organic group having from 2 to 22 carbon atoms, and
- $R_2$ is hydrogen, or an organic group having from 2 to 22 carbon atoms, and
- M is hydrogen, ammonium, organoammonium or a metal ion.

19. The method according to claim 18, wherein the particulate inorganic solid has been treated with the organophosphinic compound during a micronization stage.

20. The method according to claim 19, wherein the particulate inorganic solid is titanium dioxide.

21. The method according to claim 19, wherein the particulate inorganic solid is titanium dioxide, and $R_1$ is hexyl-, octyl-, isooctyl- or 2-ethylhexyl-.

* * * * *